United States Patent
Sivathanu et al.

(10) Patent No.: US 9,424,162 B2
(45) Date of Patent: Aug. 23, 2016

(54) ANALYZING I/O TRACES

(71) Applicant: VMware, Inc., Palo Alto, CA (US)

(72) Inventors: Sankaran Sivathanu, Mountain View, CA (US); Jinpyo Kim, Cupertino, CA (US); Bing Tsai, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 158 days.

(21) Appl. No.: 14/291,584

(22) Filed: May 30, 2014

(65) Prior Publication Data

US 2015/0347266 A1    Dec. 3, 2015

(51) Int. Cl.
| | |
|---|---|
| *G06F 11/00* | (2006.01) |
| *G06F 11/34* | (2006.01) |
| *G06F 11/36* | (2006.01) |
| *G06F 9/50* | (2006.01) |
| *G06F 13/14* | (2006.01) |

(52) U.S. Cl.
CPC ......... *G06F 11/3485* (2013.01); *G06F 9/5061* (2013.01); *G06F 11/348* (2013.01); *G06F 11/3466* (2013.01); *G06F 11/3476* (2013.01); *G06F 11/3636* (2013.01); *G06F 13/14* (2013.01)

(58) Field of Classification Search
CPC ........... G06F 11/3466; G06F 11/3476; G06F 11/348; G06F 11/3485; G06F 11/349
See application file for complete search history.

(56) References Cited

U.S. PATENT DOCUMENTS

| | | | | |
|---|---|---|---|---|
| 6,018,809 A | * | 1/2000 | Garrett | G06F 11/25 714/37 |
| 6,912,673 B1 | * | 6/2005 | Wyland | G06F 11/364 714/43 |
| 2004/0015317 A1 | * | 1/2004 | Klotz | G06F 11/263 702/123 |
| 2012/0124422 A1 | * | 5/2012 | Hsiao | G06F 11/3466 714/26 |
| 2013/0243190 A1 | * | 9/2013 | Yang | H04L 9/0816 380/44 |

* cited by examiner

*Primary Examiner* — Charles Ehne

(57) ABSTRACT

Systems and techniques are described for analyzing input output I/O traces. One of the techniques includes receiving an I/O trace, the I/O trace identifying a temporal sequence of previously submitted I/O requests; partitioning the I/O trace into a plurality of partitions based on a load pattern of the I/O requests in the I/O trace and a data access pattern of the I/O requests in the I/O trace; and generating a signature for each partition, wherein the signature for each of the partitions identifies characteristics of the I/O requests in the partition, and wherein the characteristics of the I/O requests in the partition include the load pattern of the I/O requests in the partition and the data access pattern of the I/O requests in the partition.

18 Claims, 3 Drawing Sheets

ANALYZING I/O TRACES

BACKGROUND

This document relates to analyzing input/output (I/O) traces for applications executing on virtual machines.

A virtual machine (VM) is a software-based abstraction of a physical computer system. A VM is executed on a physical computer through the use of virtualization software typically referred to as a "hypervisor." A physical computer system, referred to herein as a physical machine, can execute one or more VMs. The hypervisor is software that is logically interposed between and interfaces with a VM and a physical computer system. In general, each VM is configured to execute an operating system, referred to herein as a guest OS, and applications.

Some existing systems are configured to generate I/O traces for applications executing on virtual machines. An I/O trace for a given application includes data identifying I/O requests and characteristics for each of the I/O requests. The characteristics of the I/O requests that are included in the I/O trace can include the time that each I/O request was submitted, the logical block requested to be written to or read from by the I/O request, and so on. Some systems make use of the I/O trace by replaying the I/O requests identified in the trace in order to evaluate the performance of computing resources. However, traces for certain kinds of workloads can be very large and, in some scenarios, e.g., when multiple traces are replayed in parallel, transmitting and processing the traces can be difficult.

The details of one or more embodiments of the subject matter described in this document are set forth in the accompanying drawings and the description below. Other features, aspects, and advantages of the subject matter will become apparent from the description, the drawings, and the claims.

DETAILED DESCRIPTION

Particular embodiments of the subject matter described in this document can be implemented so as to realize one or more of the following advantages. Data characterizing I/O traces for use in generating workloads can be stored in an efficient and compact manner. A workload can be generated from signatures for I/O trace partitions, reducing the amount of data transmitted over a network in order to generate workloads using trace data in a cloud-based environment. By using signatures for I/O trace partitions to generate workloads, workloads can be generated that include portions of several different I/O traces. Additionally, new consolidation scenarios can be created from the I/O trace partitions, thereby increasing the coverage of the performance evaluation.

Figure 1:
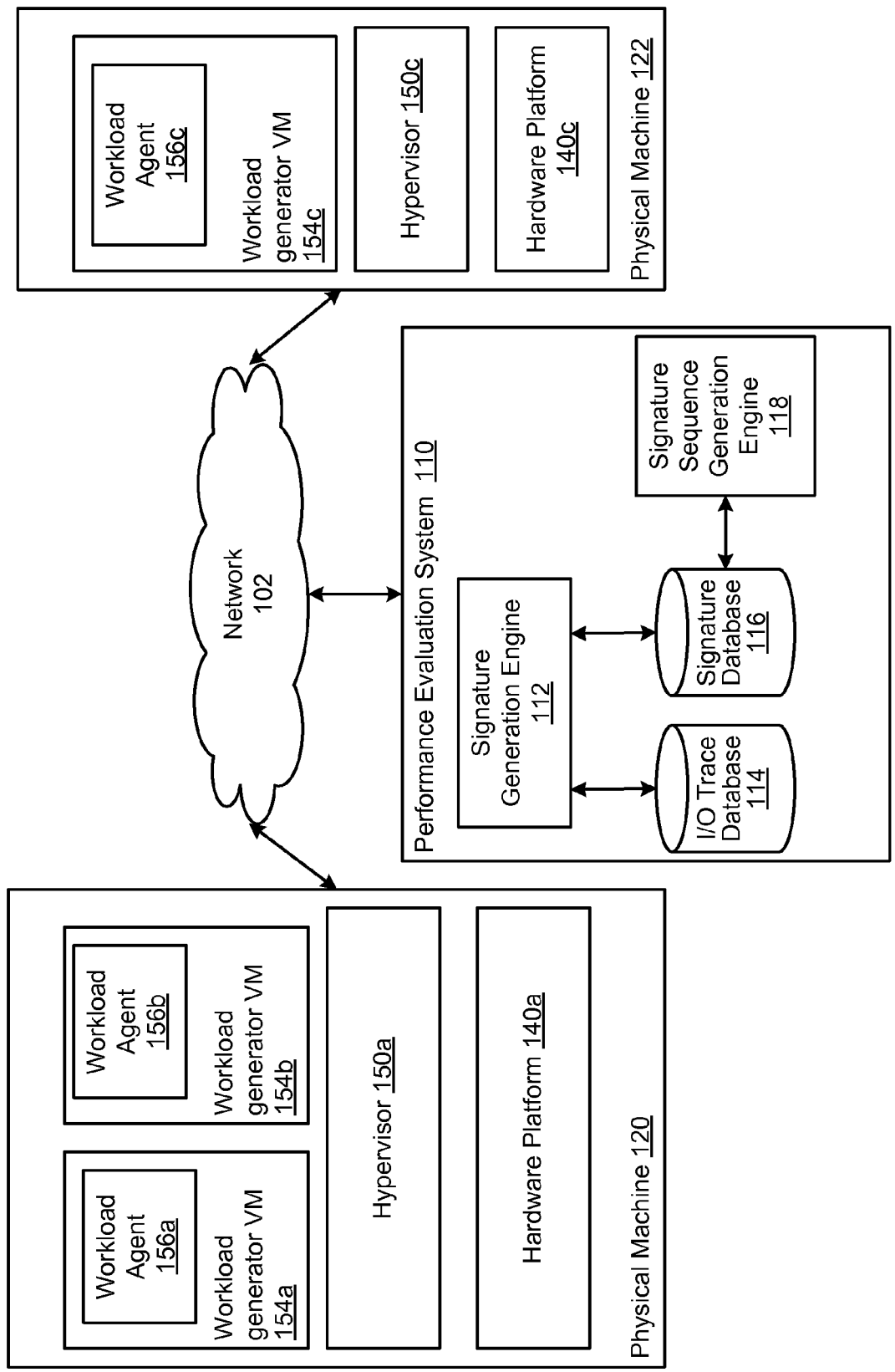
FIG. 1 shows an example performance evaluation system.

FIG. 1 shows an example performance evaluation system 110. The performance evaluation system 110 is an example of a system implemented as computer programs on one or more computers in one or more locations, in which the systems, components, and techniques described below are implemented.

The performance evaluation system 110 evaluates the performance of computing resources using input/output (I/O) traces from an I/O trace database 150. Each I/O trace in the I/O trace database identifies a temporal sequence of I/O requests submitted by an application, e.g., an application executing on a virtual machine (VM). For each I/O request, the I/O trace identifies the time the request was submitted and the logical block corresponding to the I/O request, i.e., the logical block requested to be written to or read from, and, optionally, other information characterizing the I/O request.

The performance evaluation system 110 includes a signature generation engine 112 that partitions the I/O traces in the I/O trace database 114 into I/O trace partitions and generates a respective signature for each I/O trace partition. Generally, the signature generation engine 112 partitions an I/O trace based on load patterns and data access patterns for the I/O requests in the I/O trace. The signature for each partition includes data characterizing the requests in the I/O trace partition, e.g., data identifying the load patterns and data access patterns for the requests in the I/O trace partition. Partitioning an I/O trace and generating signatures for I/O trace partitions is described in more detail below with reference to FIG. 2. Once generated, the signature generation engine 112 stores the signature in a signature database 116.

The performance evaluation system 110 also includes a signature sequence generation engine 118. The signature sequence generation engine 118 generates sequences of signatures from signatures stored in the signature database 116 and provides the sequences to workload generator VMs, e.g., workload generator VMs 154a-154c, through a data communication network 102, e.g., a local area network (LAN) or wide area network (WAN), e.g., the Internet, or a combination of networks, for use in generating workloads from the signature sequences. In some implementations, the signature sequence generation engine 118 generates the sequence of signatures by recompiling an I/O trace from the partitions generated from the I/O trace. That is, the signature sequence generation engine 118 can combine the signatures for each partition of a given I/O trace to generate the sequence of signatures. In some other implementations, however, the signature sequence generation engine 118 can generate a sequence of signatures that includes signatures for I/O trace partitions from multiple different I/O traces. For example, the signature sequence generation engine 118 can provide a user interface for presentation to a user that presents data identifying signatures stored in the signature database 116. The user can submit an input through the user interface identifying signatures to be included in a sequence of signatures. The user may be able to select signatures for partitions from multiple different I/O traces to be included in the same sequence of signatures. In response to receiving the input, the signature sequence generation engine 118 generates the sequence of signatures and provides the sequence to one of the workload generator VMs 154a-154c through the data communication network 102.

Each workload VM 154a-154c executes on a physical machine. In the example illustrated in FIG. 1, VMs 154a and 154b execute on one physical machine 120 while workload VM 154c executes on a different physical machine 122. However, in other cases, all of the workload VMs may execute on the same physical machine or each workload VM can execute on a different physical machine from each other workload VM. The physical machines 120 and 122 each include a hardware platform, e.g., the hardware platforms 140*a* and 140*c*. Each hardware platform may include, for example, a processor (CPU), a memory management unit (MMU), memory (e.g., Random Access Memory (RAM)), a local storage unit (e.g., hard disk or flash memory), a network adapter, and so on. The physical machines 120 and 122 also each include a hypervisor, e.g., hypervisors 150*a* and 150*c*. Each hypervisor is a virtualization software layer that executes on the hardware platform of the physical machine. The hypervisor manages a virtual machine execution space within which the VMs executing on the physical machine are executed. For each VM executing on the physical machine, the hypervisor manages a corresponding virtual hardware platform. Each virtual hardware platform includes emulated hardware, e.g., a virtual storage device, a virtual network adapter/interface, virtual memory, a virtual processor, and so on. The hypervisor transforms input/output (I/O) requests from the VMs managed by the hypervisor to the corresponding virtual hardware platform into corresponding requests to the hardware platform of the physical machine.

Each workload VM 154*a*-154*c* executes a respective workload agent 156*a*-156*c*. Each of the workload agents receives a sequence of signatures from the performance evaluation system 110 and generates a workload from the sequence of signatures. Generating a workload from a sequence of signatures is described in more detail below with reference to FIG. 3. Once the workload is generated, the workload agent causes the workload generator VM executing the workload agent to issue each I/O request in the workload for execution by the corresponding physical machine in the order specified by the workload. By generating workloads from signatures of I/O trace portions rather than directly from I/O traces, the amount of data necessary to be communicated to the workload VMs 154*a*-154*c* from the performance evaluation system 110 may be reduced while allowing the workload VMs 154*a*-154*c* to generate workloads that have the characteristics of the corresponding I/O trace portions.

Figure 2:
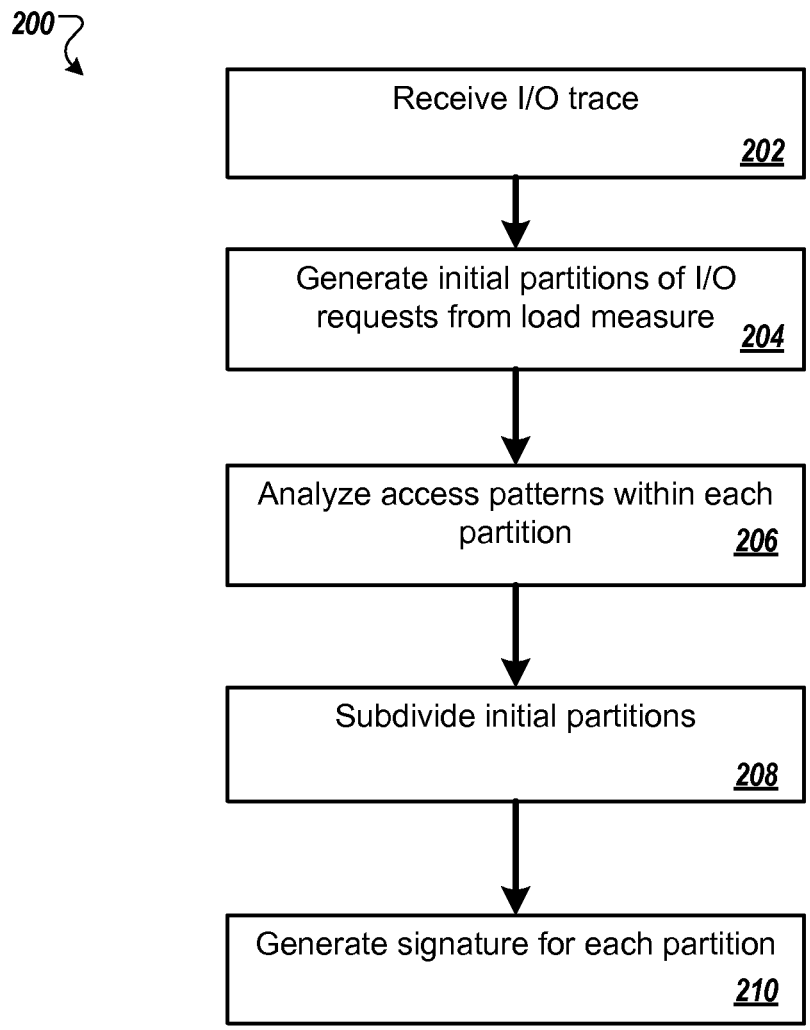
FIG. 2 is a flow diagram of an example process for generating signatures for I/O trace partitions.

FIG. 2 is a flow diagram of an example process 200 for generating signatures for I/O trace partitions. For convenience, the process 200 will be described as being performed by a system of one or more computers located in one or more locations. For example, a performance evaluation system, e.g., the performance evaluation system 110 of FIG. 1, appropriately programmed, can perform the process 200.

The system receives an I/O trace (step 202). The I/O trace identifies a temporal sequence of I/O requests submitted by an application, e.g., an application executing on a VM.

The system generates initial partitions of I/O requests from load patterns in the temporal sequence of I/O requests (step 204). For example, using the timestamp associated with each I/O request, the system can compute an I/O request issue rate at each time in the temporal sequence. The system can then set the boundaries of each of the initial partitions so that each initial partition includes time intervals during which the I/O request rate is between particular request rate thresholds. For example, the system can generate a low request rate partition that includes time intervals during which the I/O request rate is between zero and a first threshold value, a medium request rate partition that includes time intervals during which the I/O request rate is between the first threshold value and a second, higher threshold value, and so on. In some implementations, the number of initial partitions is pre-determined. In some other implementations, the number of initial partitions is computed by the system based on the spread in I/O request rates in the I/O trace, the total number of I/O requests in the trace, or both.

The system analyzes data access patterns of the I/O requests within each initial partition (step 206). That is, for each time subinterval of pre-determined duration, e.g., half of a second, one second, or two seconds, within each initial partition, the system computes one or more metrics that characterize the data access pattern within the subinterval. For example, for the I/O requests in each subinterval, the system can compute one or more of: a read-write ratio, i.e., a ratio of read requests to write requests for the I/O requests in the subinterval, a sequential request percentage for the requests in the subinterval, a random request percentage for the requests in the subinterval, an average size of I/O requests in the subinterval, and an average seek distance between I/O requests in the partition. Optionally, the system also computes one or more load metrics for each subinterval, e.g., the average issue rate for the subinterval.

The system subdivides each initial partition using the metrics computed for the subintervals in the initial partition (step 208). For example, the system can iteratively compare the metrics computed for each subinterval to determine whether the subinterval should be merged with the following subinterval. That is, the system can initially compare the metrics computed for the earliest subinterval in the initial partition with the metrics computed for the subsequent subinterval in the initial partition. If each metric for the subsequent subinterval is within a threshold percentage, e.g., within 2.5%, 5%, or 10%, of the corresponding metric for the earliest interval, the system merges the two subintervals into a new subinterval. The system can then compute an average value for each metric for the new subinterval and compare the average values for the new subinterval with the metrics computed for the next subinterval to determine if the next subinterval meets the criteria for being merged with the new subinterval. If two adjacent subintervals do not meet the criteria for being merged, the system designates the earlier of the two subintervals as a new partition, and proceeds to compare the later subinterval of the two subintervals with the next subinterval, e.g., as described above.

After the initial partitions have been subdivided to generate a final partitioning of the trace, the system generates a signature for each partition (step 210). The signature for a given partition includes data that characterizes the I/O requests included in the partition. In particular, the data characterizing the I/O requests in a given partition includes data identifying the load pattern metric values for the requests in the partition, e.g., the highest and lowest issue rates within the partition and the average issue rate for the partition, and data identifying the average data access pattern metric values for the partition. Optionally, for one or more of the metrics, the signature can include not only an average value of the metric for the partition, but also data identifying a distribution of the metric values within the partition. For example, for one or more of the data access pattern metrics, the signature can include a histogram of the distribution of the metric values within the partition.

Figure 3:
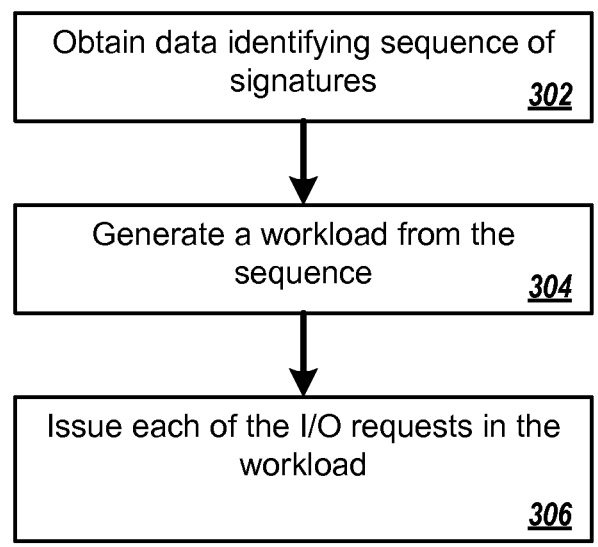
FIG. 3 is a flow diagram of an example process for generating a workload from I/O trace partition signatures Like reference numbers and designations in the various drawings indicate like elements.

FIG. 3 is a flow diagram of an example process 300 for generating a workload from I/O trace partition signatures. For convenience, the process 300 will be described as being performed by a system of one or more computers located in one or more locations. For example, a workload generator VM executing on a physical machine, e.g., any of the load generator VMs 154*a*-154*c* executing on the physical machines 120 or 122 of FIG. 1, appropriately programmed, can perform the process 300.

The system obtains data identifying a sequence of I/O trace partition signatures (step 302). In some cases, the signatures in the sequence may be signatures for different I/O trace partitions from the same I/O trace. In other cases, however, the signatures may be signatures for different I/O trace partitions from different I/O traces.

In some implementations, a user may submit an input through a user interface provided by the system or by a performance evaluation system, e.g., the performance evaluation system 110 of FIG. 1, that defines the sequence of I/O trace partition signatures. That is, either system may provide a user interface for presentation to the user that identifies signatures for I/O trace partitions that are accessible to the system. The user may be able to select I/O trace partitions to be included in the sequence and define the order of the I/O trace partitions in the sequence by submitting inputs through the user interface.

The system generates a workload from the sequence of I/O trace partition signatures (step 304). That is, for each signature, the system generates a set of I/O requests that match the characteristics identified in the signature. In particular, the system generates a set of I/O requests having the data access pattern identified in the signature and the load pattern identified in the signature. If the signature includes other statistics for the partition, the system generates the sequence of I/O requests so that the I/O requests can be characterized by the same statistics as identified in the signature. The system then aggregates the I/O requests in each set to generate the complete workload.

The system issues each of the I/O requests in the workload in sequence to measure the performance of one or more computing resources, e.g., to measure the performance of a physical machine on which the VM issuing the requests executes (step 306).

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving an input output (I/O) trace, the I/O trace identifying a temporal sequence of previously submitted I/O requests;
partitioning the I/O trace into a plurality of partitions based on a load pattern of the I/O requests in the I/O trace and a data access pattern of the I/O requests in the I/O trace;
generating a signature for each partition, wherein the signature for each of the partitions identifies characteristics of the I/O requests in the partition, and wherein the characteristics of the I/O requests in the partition include the load pattern of the I/O requests in the partition and the data access pattern of the I/O requests in the partition;
combining one or more of the signatures with one or more signatures for partitions of other I/O traces to generate a sequence of signatures; and
providing the sequence of signatures to a virtual machine for use in generating a workload.

2. The method of claim 1, wherein the I/O trace is an I/O trace for an application executing on a virtual machine, and wherein the previously submitted I/O requests are I/O requests submitted by the application.

3. The method of claim 1, wherein partitioning the I/O trace comprises:
generating a plurality of initial partitions of the I/O trace based on the load pattern;
determining a respective data access pattern for the I/O requests in each initial partition; and
subdividing each initial partition into two or more additional partitions based on the data access pattern for the I/O requests in the initial partition.

4. The method of claim 3, wherein generating the plurality of initial partitions of the I/O trace based on the load pattern comprises:
dividing the temporal sequence into the plurality of initial partitions, wherein each initial partition includes each time interval during which an I/O request rate at any time in the time interval is between a respective first threshold value and a respective second threshold value.

5. The method of claim 1, wherein determining the respective data access pattern for the I/O requests in each initial partition comprises:

computing, for each of a plurality of subintervals within the initial partition, one or more metrics that characterize the data access pattern of the I/O requests in the subinterval.

6. The method of claim 5, wherein subdividing each initial partition into two or more additional partitions comprises generating each additional partition from one or more of the subintervals based at least in part on the metrics computed for the subintervals.

7. The method of claim 5, wherein the signature for each partition comprises data identifying a distribution of one or more of the metrics that characterize the data access pattern of the I/O requests in the partition.

8. The method of claim 1, further comprising:
receiving, by the virtual machine, the sequence of signatures;
generating a respective set of I/O requests from each signature in the sequence of signatures, wherein generating the respective set of I/O requests comprises:
generating a set of I/O requests that have the same characteristics as the characteristics identified in the corresponding signature;
combining the sets of I/O requests to generate a workload; and
issuing, by the virtual machine, the I/O requests in the workload for execution.

9. A system comprising one or more computers and one or more storage devices storing instructions that when executed by the one or more computers cause the one or more computers to perform operations comprising:
receiving an input output (I/O) trace, the I/O trace identifying a temporal sequence of previously submitted I/O requests;
partitioning the I/O trace into a plurality of partitions based on a load pattern of the I/O requests in the I/O trace and a data access pattern of the I/O requests in the I/O trace;
generating a signature for each partition, wherein the signature for each of the partitions identifies characteristics of the I/O requests in the partition, and wherein the characteristics of the I/O requests in the partition include the load pattern of the I/O requests in the partition and the data access pattern of the I/O requests in the partition;
combining one or more of the signatures with one or more signatures for partitions of other I/O traces to generate a sequence of signatures; and
providing the sequence of signatures to a virtual machine for use in generating a workload.

10. The system of claim 9, wherein partitioning the I/O trace comprises:
generating a plurality of initial partitions of the I/O trace based on the load pattern;
determining a respective data access pattern for the I/O requests in each initial partition; and
subdividing each initial partition into two or more additional partitions based on the data access pattern for the I/O requests in the initial partition.

11. The system of claim 10, wherein generating the plurality of initial partitions of the I/O trace based on the load pattern comprises:
dividing the temporal sequence into the plurality of initial partitions, wherein each initial partition includes each time interval during which an I/O request rate at any time in the time interval is between a respective first threshold value and a respective second threshold value.

12. The system of claim 9, wherein determining the respective data access pattern for the I/O requests in each initial partition comprises:
computing, for each of a plurality of subintervals within the initial partition, one or more metrics that characterize the data access pattern of the I/O requests in the subinterval.

13. The system of claim 12, wherein subdividing each initial partition into two or more additional partitions comprises generating each additional partition from one or more of the subintervals based at least in part on the metrics computed for the subintervals.

14. A computer storage medium storing instructions that, when executed by one or more computers, cause the one or more computers to perform operations comprising:
receiving an input output (I/O) trace, the I/O trace identifying a temporal sequence of previously submitted I/O requests;
partitioning the I/O trace into a plurality of partitions based on a load pattern of the I/O requests in the I/O trace and a data access pattern of the I/O requests in the I/O trace;
generating a signature for each partition, wherein the signature for each of the partitions identifies characteristics of the I/O requests in the partition, and wherein the characteristics of the I/O requests in the partition include the load pattern of the I/O requests in the partition and the data access pattern of the I/O requests in the partition;
combining one or more of the signatures with one or more signatures for partitions of other I/O traces to generate a sequence of signatures; and
providing the sequence of signatures to a virtual machine for use in generating a workload.

15. The computer storage medium of claim 14, wherein partitioning the I/O trace comprises:
generating a plurality of initial partitions of the I/O trace based on the load pattern;
determining a respective data access pattern for the I/O requests in each initial partition; and
subdividing each initial partition into two or more additional partitions based on the data access pattern for the I/O requests in the initial partition.

16. The computer storage medium of claim 15, wherein generating the plurality of initial partitions of the I/O trace based on the load pattern comprises:
dividing the temporal sequence into the plurality of initial partitions, wherein each initial partition includes each time interval during which an I/O request rate at any time in the time interval is between a respective first threshold value and a respective second threshold value.

17. The computer storage medium of claim 14, wherein determining the respective data access pattern for the I/O requests in each initial partition comprises:
computing, for each of a plurality of subintervals within the initial partition, one or more metrics that characterize the data access pattern of the I/O requests in the subinterval.

18. The computer storage medium of claim 17, wherein subdividing each initial partition into two or more additional partitions comprises generating each additional partition from one or more of the subintervals based at least in part on the metrics computed for the subintervals.

* * * * *